J. L. ADAMS, Jr.
PROCESS OF ELECTRIC WELDING.
APPLICATION FILED NOV. 3, 1919.

1,332,184.

Patented Feb. 24, 1920.

WITNESS

INVENTOR
James L. Adams Jr.
BY
Erwin, Wheeler & Woolard
ATTORNEYS

UNITED STATES PATENT OFFICE.

JAMES L. ADAMS, JR., OF MILWAUKEE, WISCONSIN, ASSIGNOR TO A. O. SMITH CORPORATION, OF MILWAUKEE, WISCONSIN, A CORPORATION OF NEW YORK.

PROCESS OF ELECTRIC WELDING.

1,332,184.      Specification of Letters Patent.      Patented Feb. 24, 1920.

Application filed November 3, 1919. Serial No. 335,261.

*To all whom it may concern:*

Be it known that I, JAMES L. ADAMS, Jr., a citizen of the United States, and resident of the city of Milwaukee, county of Milwaukee, and State of Wisconsin, have invented a new and useful Improvement in Processes of Electric Welding; and I do declare the following to be a full, clear, and exact description thereof, such as will enable persons skilled in the art to which the invention pertains to make, use, and practise the same, reference being had to the drawing hereto attached for disclosure of certain details as to the manner of using the invention.

This invention relates to the art of electric arc welding.

The invention resides in an improved process of welding in which a fusible metallic electrode and a welding strip, which may possess the same or different characteristics, are employed.

While the invention has been specifically applied to the welding of tubes formed from sheet metal plates, and will be so described, it is obvious that the invention may be used in connection with the production of tubular or hollow structures built up from a plurality of properly shaped shell like members, the meeting edges of which are brought into substantially abutting contact; and the invention may likewise be applied to the production of the joint uniting flat metal plates, which latter have their meeting edges arranged in the same manner.

In the production of tubular structures from flat metal plates which are shaped by the dies of a forming press, the meeting edges of the plates do not always come into exactly parallel lines, nor do such edges always lie in the same plane.

As a result of the first mentioned condition, the space between the edges of the plates is irregular, and it has followed that an imperfectly welded joint is sometimes produced by reason of the tendency of the electric arc to burn out and enlarge the wider parts of the opening; again, in welding machines in which the fusible metallic electrode is fed to the work in direct ratio to the consumption of such electrode, the amount of molten metal flowing from the electrode is not sufficient, in some instances, to fill the open space in the degree desired.

In its second aspect, when the edges of the plate forming the tube do not lie in the same plane, a true cylinder can not be produced. The objections due to the irregular diameters of the tube are serious, and necessitate additional and subsequent machining operations which increase materially the cost of production of the finished article.

But the adverse conditions are completely overcome by the simple expedients which constitute my invention, which latter embraces a welding strip adapted to be inserted in the joint of the parts to be welded, and adapted to provide the necessary amount of molten metal to fill the open space at the joint, and incidental thereto to present a means for securing the alinement of the elements in forming a true cylinder. The said welding strip will be made of any material suitable to the work to be welded.

Viewed in a further aspect, my invention resides in the use of a welding strip designed to be applied at the lower side of the welding line, and extending outwardly therefrom so as to close the open space in the work, and prevent the molten metal from flowing through the wider parts of such open space.

In the accompanying drawing,

Figure 1, in a broken sectional view, shows the meeting edges of a tube rolled from a metal sheet and indicates the radial displacement sometimes found to exist, and which is cured by my invention.

Figure 1:
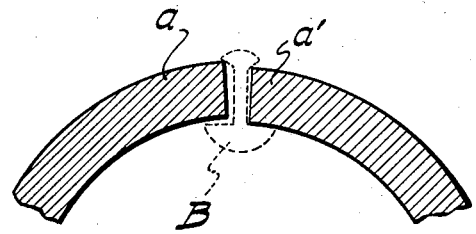
Figure 3:
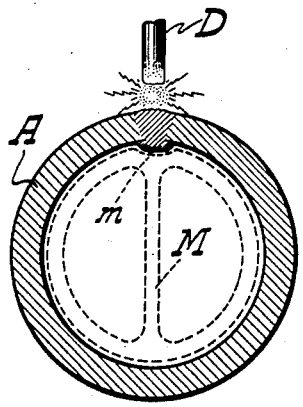
Fig. 3 is a sectional view on the line 3—3, Fig. 2, showing the completed tube, and showing the formation of the welded joint.
Figure 2:
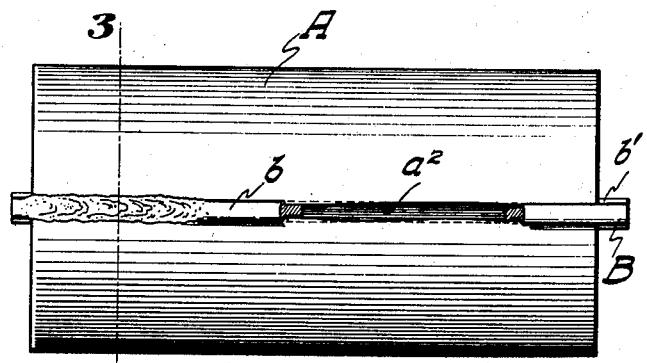
Fig. 2 is a plan of a tube showing the open seam of irregular or varying width, and indicating the manner in which my invention is applied.

In the drawings, $a$ and $a'$, Fig. 1, indicate in magnified proportions, the edges of a metal plate which latter has been rolled into cylindrical form in constructing a tube, such as is indicated by the letter A in Figs. 2 and 3. In the process of transforming the flat plate into the cylindrical structure indicated, it is not always possible to bring the edges $a$, $a'$, into abutting contact, by reason of irregularities produced in shaping the cylinder. As a result of this condition, the edges of the plate do not follow exactly parallel lines, and consequently an open space of varying width will be formed at the joint as indicated at $a^2$.

The tubular construction is completed by welding along the line $a^2$, and in the welding process the electric arc has a tendency to burn out or enlarge the wider portions of the open space, thus producing a joint in portions of which no welding action has been effected. In this class of welding, it is usual to employ a fusible metallic electrode for transmitting the electric current to the work to be welded. Such electrode is fused at a rate proportioned to the feed of the electrode under the point of which the work is moved in a given path, but in some types of welding machines, the fusible electrode is moved along the welding line. In all of such cases the fusible electrode has constituted the source from which the supply of molten metal for filling the opening at the joint has been drawn. But with the electrode and the work moving in predetermined relation to each other, the irregularities in the opening at the joint require a variable amount of molten metal, which the fusible electrode, operating as described, cannot supply.

I therefore provide an additional supply in the form of a welding strip which is inserted in the joint, and which, when fused, will ordinarily furnish sufficient molten metal to completely fill the opening, but which will be augmented by a smaller quantity of the metal flowing from the electrode.

In the drawing, B indicates the welding strip which I have referred to. Such welding strip in its cross-sectional construction is approximately of I-shape, the top and bottom flanges, $b$ and $b'$, of which are connected by a thin web $b^2$, the strip being designed to be pushed endwise into the open space by which the edges of the work are separated. When in such position, the flanges $b$ and $b'$, of the welding strip rest against and embrace the upper and lower sides, respectively, of the plate from which the tube is formed. The bottom flange is of rounded contour upon its outer surface, so as to constitute a bead or rib $b^3$, which feature is preserved in the completed work. The edges of the work rest in the angles formed by the web and the upper side of the bottom flange. The under sides of the top flanges $b$, are produced with bevels $b^4$, which extend to the web $b^2$, of the strip, in such manner that when the strip is inserted in the opening between the edges $a$ and $a'$, of the work, such edges will be brought into the same plane upon compression being applied, and a true cylinder formed, the compressive strain causing the edges of the tube, if displaced, to move over the beveled portions of the strip until both of such edges are in exact register.

The welding strip thus constructed, when fused by the arc flowing from the electrode D, is further effective to yield an amount of molten metal sufficient to completely fill the open space between the edges of the work, and unite the latter into a homogeneous structure. Any surplus metal, as well as any which may be deposited upon the exterior of the tube in the flow from the fusible electrode D, will be removed by grinding such surplus away.

A cooling mandrel M, grooved at $m$, for the reception of the bead or rib $b^3$, may be employed. Upon the application of a welding current of proper amperage by means of the electrode D, the welding strip B will be fused as far as the bottom flange thereof. At the same time, the edges $a$ and $a'$ of the work are brought to a fusing temperature in a localized area extending parallel to the welding line. This fusing of the welding strip B, and the contiguous edges of the plate forming the tube A, will produce a welded joint of uniform structure throughout, and reinforced at its under side by the bead or rib $b^3$, the formation of the latter not being disturbed by the welding operation. The electrodes preferred are of the covered or wrapped type, the covering of such electrodes being chemically treated, in any suitable manner, such for instance, as is disclosed in the patent to R. Stanley Smith, No. 1,301,331, April 22, 1919. By using the welding strip, as described, the fusible electrode becomes merely an adjunct thereto, in so far as contributing molten metal for incorporation in the welded joint is concerned. The consumption of the electrode in the welding operation is materially reduced, with a consequent reduction in the cost of the work. The amount of fused metal flowing from the electrode will be sufficient only to augment that furnished by the welding strip in securing a deposit which will completely fill the open space at the joint. Any excess of metal remaining upon the outer side of the tube at the completion of the welding operation, will be removed by grinding so as to produce a tube with a smooth exterior surface.

Figure 4:
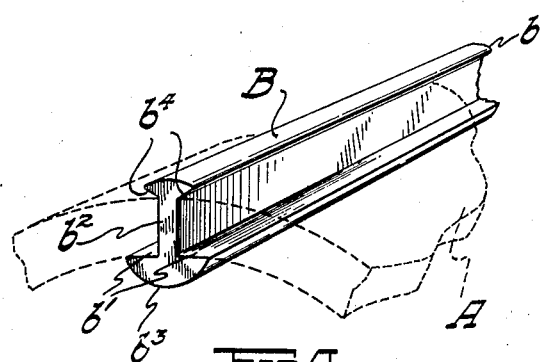
Fig. 4 is a perspective view showing the configuration of the welding strip, and the manner of its application to aline the edges of the tube, the latter being shown in dotted lines.

In Figs. 1 and 4 of the drawing, I have illustrated the invention only in a conventional manner, and not in the exact proportions which the parts will have in actual practice. For instance, the upper flange $b$, of the welding strip, will not in its cross sectional area approximate that of the lower flange $b'$, but will be only of such dimensions as will enable the formation of the bevels $b^4$ to effect their purpose of holding the edges of the work in alinement in the channels which are formed in the sides of the welding strip B. On the other hand, the lower flange will be of sufficient width to spread across the open space at its greatest irregularity, to prevent the molten metal from running through. It is desirable to avoid fusing the bottom flange of the welding strip B, in a degree which would destroy the contour thereof, but should this take place through the use of a welding current of too high an amperage, the mold $m$, in the face of the mandrel M, will re-form such bottom flange into the desired bead or rib.

Having thus described my invention, what I claim and desire to secure by Letters Patent of the United States is:—

1. The process of arc welding, which consists in forcing the edges of the work to be welded into the opposite channels of a fusible metallic welding strip to secure the alinement of the said edges, and applying an electric current by means of a fusible metallic electrode, to fuse the parts and produce a welded joint.

2. The process of producing tubular structures by arc welding, which consists in bringing the edges of a plate into proximity, inserting a double channeled fusible welding strip into the space between said edges, forcing the latter into engagement with the strip to secure the alinement of the edges, and applying an electric current by means of a fusible metallic electrode, to fuse the parts along the welding line and produce a welded joint.

3. The process of arc welding, which consists in bringing into proximity the edges of the work to be welded, applying a welding strip at the under side of the welding line to close the open space between the parts and retain the molten metal, and fusing all of the said parts together by the application of a welding current.

In testimony whereof, I have signed my name at Milwaukee, this 29th day of October, 1919.

JAS. L. ADAMS, JR.

Witnesses:
W. F. WOOLARD,
C. THEO. OSTERBERG.